(12) United States Patent
Yang et al.

(10) Patent No.: US 11,354,448 B2
(45) Date of Patent: Jun. 7, 2022

(54) DEMAND TRUSTED DEVICE-BASED DATA ACQUISITION METHODS, APPARATUSES, AND DEVICES

(71) Applicant: ALIPAY (HANGZHOU) INFORMATION TECHNOLOGY CO., LTD., Zhejiang (CN)

(72) Inventors: Wenyu Yang, Hangzhou (CN); Renhui Yang, Hangzhou (CN); Qin Liu, Hangzhou (CN); Yuan Chen, Hangzhou (CN); Shubo Li, Hangzhou (CN); Sheng Zhang, Hangzhou (CN); Qin Xiong, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,476

(22) Filed: Jun. 25, 2021

(65) Prior Publication Data

US 2021/0326485 A1 Oct. 21, 2021

(30) Foreign Application Priority Data

Sep. 4, 2020 (CN) .......................... 202010921425.1

(51) Int. Cl.
  *G06F 21/64* (2013.01)
  *G06F 21/60* (2013.01)
  *H04L 9/32* (2006.01)

(52) U.S. Cl.
  CPC ............ *G06F 21/64* (2013.01); *G06F 21/602* (2013.01); *H04L 9/3239* (2013.01); *H04L 2209/38* (2013.01)

(58) Field of Classification Search
  CPC ..... G06F 21/64; G06F 21/602; H04L 9/3239; H04L 2209/38; H04L 9/006;
  (Continued)

(56) References Cited

U.S. PATENT DOCUMENTS

| 10,505,741 | B1 | 12/2019 | Conley | |
|---|---|---|---|---|
| 2015/0067330 | A1* | 3/2015 | Khan | .................. H04L 63/0428 |
| | | | | 713/168 |
| 2018/0254898 | A1* | 9/2018 | Sprague | ................ H04L 9/3271 |

FOREIGN PATENT DOCUMENTS

| CN | 1996955 | 7/2007 |
|---|---|---|
| CN | 103677935 | 3/2014 |

(Continued)

OTHER PUBLICATIONS

Crosby et al., "BlockChain Technology: Beyond Bitcoin," Sutardja Center for Entrepreneurship & Technology Technical Report, Oct. 16. 2015, 35 pages.

(Continued)

*Primary Examiner* — Abiy Getachew (74) *Attorney, Agent, or Firm* — Fish & Richardson P.C.

(57) ABSTRACT

Embodiments of the present specification disclose data acquisition methods, apparatuses, and devices related to blockchain technologies. One method comprising: publishing, as a published description, a description of target data stored in a trusted device of a data owner; in response to the published description, receiving a data acquisition request from a data requestor for the target data wherein the data acquisition request is configured to retrieve the target data from a first resource; sending the data acquisition request to the data owner; receiving first confirmation information from the data owner; identifying the target data from the trusted device based on the first confirmation information; and sending the target data to the data requestor.

17 Claims, 5 Drawing Sheets

(58) Field of Classification Search
CPC ..... H04L 9/0637; H04L 9/083; H04L 9/0866; H04L 9/14; H04L 9/30; H04L 9/3234; H04L 9/3242; H04L 9/3271
See application file for complete search history.

(56) References Cited

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111008228 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111506662 | 8/2020 |
| CN | 111741036 | 10/2020 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
Extended European Search Report in European Application No. 21181426.4, dated Dec. 13, 2021, 8 pages.

\* cited by examiner

DEMAND TRUSTED DEVICE-BASED DATA ACQUISITION METHODS, APPARATUSES, AND DEVICES

CROSS-REFERENCE TO RELATED APPLICATIONS

This application claims priority to Chinese Patent Application No. 202010921425.1, filed on Sep. 4, 2020, which is hereby incorporated by reference in its entirety.

TECHNICAL FIELD

The present application relates to the field of blockchain technologies, and in particular, to trusted device-based data acquisition methods, apparatuses, and devices.

BACKGROUND

Similar to an object, personal data, especially private data, can also be traded as a product. For example, medication data during treatment for a disease of a person and identity status data during medication can be used as a reference to develop a new drug. As such, there is a supply and demand market for personal privacy data. Based on privacy of personal data, there is an urgent need for a method for performing trusted transaction on personal private data, to avoid disclosing personal data in a transaction process.

SUMMARY

To resolve the previous technical problem, the embodiments of the present specification are implemented as follows.

According to a first aspect, embodiments of the present specification provide a trusted device-based data acquisition method, including: publishing description information of first data, where the first data is stored in a trusted device; obtaining a data acquisition request sent by a data requestor for the first data in response to the description information, where the data acquisition request is used to request to retrieve the first data based on a first resource; sending the data acquisition request to a data owner of the first data; obtaining first confirmation information from the data owner; obtaining the first data from the trusted device based on the first confirmation information; and sending the first data to the data requestor.

According to a second aspect, embodiments of the present specification provide a trusted device-based data acquisition method, including: publishing demand information of a data requestor for first data; obtaining data providing information from a data owner for the demand information, where the data providing information is used to prompt the data requestor to provide a first resource to retrieve the first data, and the first data is stored in a trusted device; sending the data providing information to the data requestor; obtaining first confirmation information from the data requestor; obtaining the first data from the trusted device based on the first confirmation information; and sending the first data to the data requestor.

According to a third aspect, embodiments of the present specification provide a trusted device-based data acquisition apparatus, including: a description information publishing module, configured to publish description information of first data, where the first data is stored in a trusted device; a data acquisition request acquisition module, configured to obtain a data acquisition request sent by a data requestor for the first data in response to the description information, where the data acquisition request is used to request to retrieve the first data based on a first resource; a data acquisition request sending module, configured to send the data acquisition request to a data owner of the first data; a first confirmation information acquisition module, configured to obtain first confirmation information from the data owner; a first data acquisition module, configured to obtain the first data from the trusted device based on the first confirmation information; and a first data sending module, configured to send the first data to the data requestor.

According to a fourth aspect, embodiments of the present specification provide a trusted device-based data acquisition apparatus, including: a demand information publishing module, configured to publish demand information of a data requestor for first data; a data providing information acquisition module, configured to obtain data providing information from a data owner for the demand information, where the data providing information is used to prompt the data requestor to provide a first resource to retrieve the first data, and the first data is stored in a trusted device; a data providing information sending module, configured to send the data providing information to the data requestor; a first confirmation information acquisition module, configured to obtain first confirmation information from the data requestor; a first data acquisition module, configured to obtain the first data from the trusted device based on the first confirmation information; and a first data sending module, configured to send the first data to the data requestor.

According to a fifth aspect, embodiments of the present specification provide a trusted device-based data acquisition device, including: at least one processor; and a memory coupled to the at least one processor, where the memory stores instructions that can be executed by the at least one processor, and the instructions are executed by the at least one processor, to enable the at least one processor to: publish description information of first data, where the first data is stored in a trusted device; obtain a data acquisition request sent by a data requestor for the first data in response to the description information, where the data acquisition request is used to request to retrieve the first data based on a first resource; send the data acquisition request to a data owner of the first data; obtain first confirmation information from the data owner; obtain the first data from the trusted device based on the first confirmation information; and send the first data to the data requestor.

According to a sixth aspect, embodiments of the present specification provide a trusted device-based data acquisition device, including: at least one processor; and a memory communicably coupled to the at least one processor, where the memory stores instructions that can be executed by the at least one processor, and the instructions are executed by the at least one processor, to enable the at least one processor to: publish demand information of a data requestor for first data; obtain data providing information from a data owner for the demand information, where the data providing information is used to prompt the data requestor to provide a first resource to retrieve the first data, and the first data is stored in a trusted device; send the data providing information to the data requestor; obtain first confirmation information from the data requestor; obtain the first data from the trusted device based on the first confirmation information; and send the first data to the data requestor.

According to a seventh aspect, embodiments of the present specification provide a computer-readable medium, the computer-readable medium stores computer-readable instructions, and the computer-readable instructions can be executed by a processor to implement the trusted device-based data acquisition method.

Embodiments of the present specification can achieve the following effects: The first data is stored in the trusted device, and only the description information of the first data is published on the supply and demand platform, to effectively protect the first data from being stolen. In addition, the first data is stored in the trusted device, to ensure that a data source of the first data is trustable, and prevent the first data from being tampered with.

BRIEF DESCRIPTION OF DRAWINGS

To describe the technical solutions in the embodiments of the present application or in the existing technology more clearly, the following briefly describes the accompanying drawings needed for describing the embodiments or the existing technology. Clearly, the accompanying drawings in the following description merely show some embodiments of the present application, and a person of ordinary skill in the art can still derive other drawings from these accompanying drawings without creative efforts.

DESCRIPTION OF EMBODIMENTS

To make the objectives, technical solutions, and advantages of the present application clearer, the following clearly and completely describes the technical solutions in one or more embodiments of the present application with reference to the specific embodiments and the corresponding accompanying drawings of the present application. Clearly, the described embodiments are some rather than all of the embodiments of the present application. All other embodiments obtained by a person of ordinary skill in the art based on the embodiments of the present application without creative efforts shall fall within the protection scope of the one or more embodiments of the present application.

The technical solutions provided in the embodiments of the present application are described in detail below with reference to the accompanying drawings.

As a resource, fluidity and accessibility of data are a foundation for many data applications and industrial development, but privacy protection in a data exchange and sharing process has always been a major challenge for the industrial development. Different from a transaction process of an object, a transaction process of data, especially private data, needs a more secure execution environment. In the existing technology, data is usually encrypted and then transmitted, but the encrypted data can also be cracked, thereby causing a data leakage.

In this solution, data to be transacted is stored in a trusted device, to ensure privacy of the data to be transacted and ensure that the data to be transacted is not tampered with. The trusted device can obtain data from a trusted data source, to ensure that the data source is trustable. Specifically, localized trusted collection software is used to obtain personal information from the data source, and the personal information is privately deployed in a network environment of the data source. In a flow network, a trusted flow service in a public cloud is formed based on a blockchain technology. The data to be transacted can be output in three modes: a plaintext mode, a ciphertext mode, and a feature vector mode, and is calculated based on a trusted application.

In this solution, data is sent based on published supply and demand information of data in a trusted network. For example, description information of the data is sent to a user in demand, or demand information is sent to a user who can have relevant data.

A transaction can be triggered by a data owner or a data requestor, and can be confirmed by the another party, to reach a consensus to complete the transaction. The transaction can be completed in a form of smart contract. In addition, the data to be transacted can be the entire data, or a value or result obtained through calculation of the entire data, which is related to a data type of the transaction between a supply party and a demand party.

The data transaction process is performed on a supply and demand platform. The supply and demand platform can be a centralized platform or a decentralized platform, for example, a blockchain network.

A blockchain (Blockchain) can be understood as a data chain formed by sequentially storing a plurality of blocks. A block header of each block includes a time stamp of the block, a hash value of information about a previous block, and a hash value of information about the block, to realize mutual verification between blocks, and form a blockchain that cannot be tampered with. Each block can be understood as a data block (a data storage unit). As a decentralized database, the blockchain is a series of data blocks that are related to each other in a cryptography method. Each data block includes information about a network transaction, to verify validity of the information (anti-counterfeiting) and generate a next block. A chain formed through an end to end connection between the blocks is the blockchain. If data in a block needs to be modified, content of all blocks after the block needs to be modified, and data backed up by all nodes in the blockchain network are modified. Therefore, it is difficult to tamper with and delete the blockchain. After data is saved in the blockchain, the blockchain is used as a method to maintain content integrity, and is reliable.

The blockchain technology mainly has the following four characteristics:

(1) Decentralization: Point-to-point transactions, coordination, and collaboration can be realized without intervention by a third party. In the blockchain network, no organization or individual can control global data, and an overall operation of a system cannot be affected when any node stops working. This type of decentralized network greatly improves data security.

(2) Non-tampering: The blockchain verifies and stores data by using an encryption technology, and adds and updates the data by using a distributed consensus algorithm. The blockchain needs each node to participate in verifying a transaction and generating a block; and all subsequent records need to be changed to modify any data. It is very difficult to modify data of a single node.

(3) Openness, transparency and traceability: Written block content is backed up and duplicated to each node, and each node has the latest entire database copy and all record information is public. Anyone can query block data through a public interface. Each transaction in the blockchain is solidified into the block data through linked storage, and superposition hash (HASH) summary processing is performed on all transaction records of all blocks by using a cryptography algorithm, to trace back to any historical transaction data.

(4) Collective maintenance: The decentralization characteristics of the blockchain network determine the collective maintenance of the blockchain network. A conventional centralized organization usually has three roles: a data storer, a data manager, and a data analyst. The blockchain network is jointly maintained by all participants in an equal manner. Each party has a clear right and responsibility, and does not need to transfer rights to a third-party agency, to achieve joint collaboration.

A core key technology of the blockchain is mainly related to the following aspects:

(1) Consensus mechanism: There is no center in a blockchain system. Therefore, a predetermined rule is needed to guide all the nodes to reach an agreement on data processing. All data interaction needs to be performed according to a strict rule and consensus.

(2) Cryptography technology: The cryptography technology is one of a core technology of the blockchain. Many classic modern cryptography algorithms are used in current blockchain applications, mainly including a hash algorithm, symmetric encryption, and asymmetric encryption, digital signature, etc.

(3) Distributed storage: The blockchain is a distributed ledger in a peer-to-peer network. Each participating node independently and fully stores and writes block data information. Advantages of distributed storage compared to conventional centralized storage are mainly reflected in two aspects: 1. Data information is backed up by each node, to avoid a data loss due to a single point of failure. 2. Data at each node is stored independently, to effectively prevent another person from maliciously tampering with historical data.

(4) Smart contract: The smart contract allows a trusted transaction without a third party. Provided that one party reaches a predetermined goal in an agreement, the contract automatically conducts the transaction. The transaction is traceable and irreversible. The smart contract has advantages such as transparency and credibility, automatic execution, and compulsory performance.

Then, a trusted device-based data acquisition method provided in embodiments of the present specification is described in detail with reference to accompanying drawings.

Figure 1:
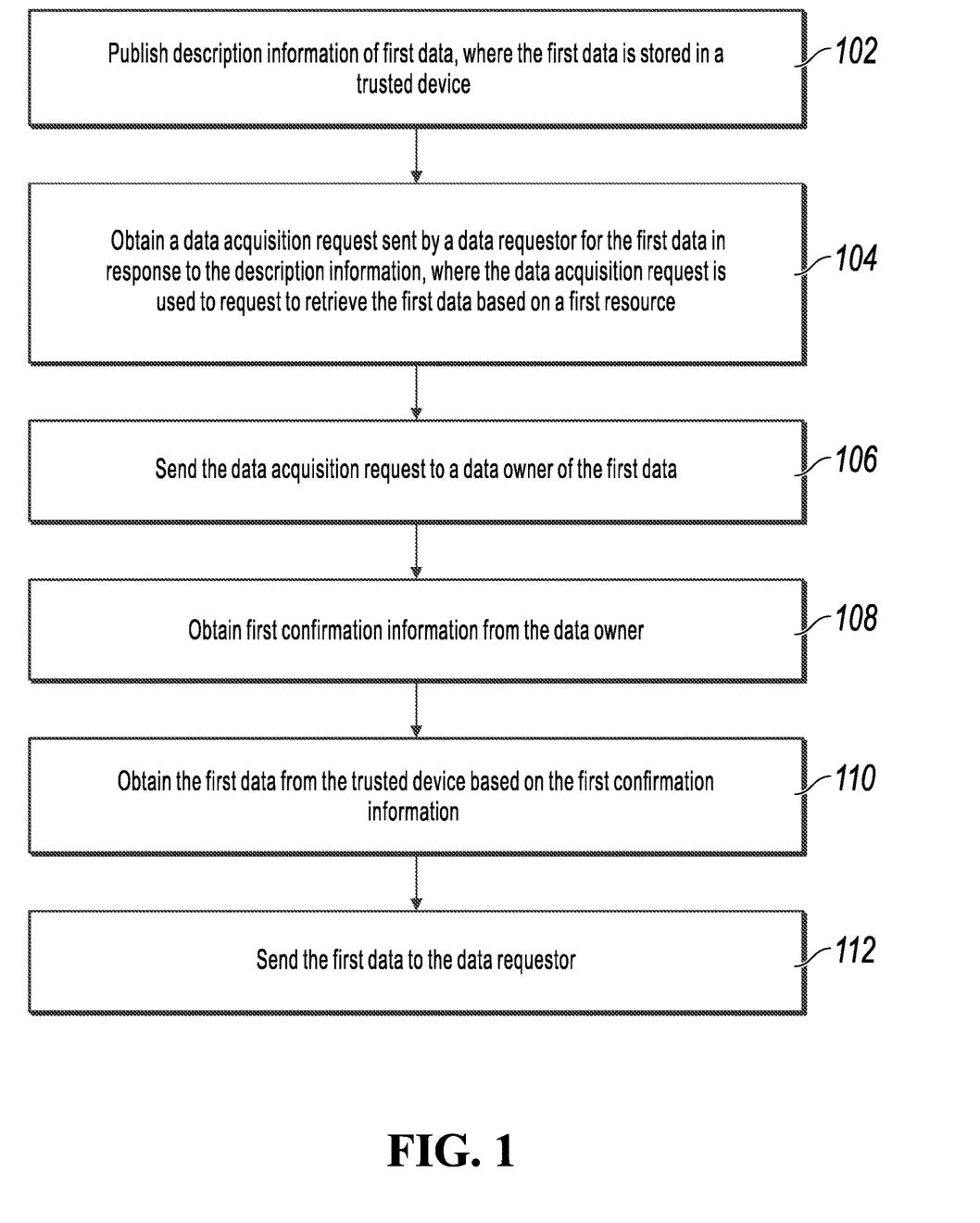
FIG. 1 is a schematic flowchart illustrating a trusted device-based data acquisition method, according to embodiments of the present specification.

FIG. 1 is a schematic flowchart illustrating a trusted device-based data acquisition method, according to embodiments of the present specification. From a perspective of program, a process can be executed by a program loaded on an application server or an application client device.

As shown in FIG. 1, the process can include the following steps.

Step 102: Publish description information of first data, where the first data is stored in a trusted device.

The first data can be data such as a text, a picture, and a video that can be transmitted in a form of digit. The first data can be personal privacy data, or can be work such as a created text, a picture, and a video.

The trusted device can be understood as a device that has a trusted environment and that is formed by using software or hardware, can be a hardware device deployed with a trusted execution environment (TEE), or can be a hardware device on which a trusted secure application (Trusted APP) is installed. The trusted device can be a mobile communications tool, a server, a tablet, an unreassurable storage device, etc.

The trusted device can be a device of a data owner of the first data. If a provider of the first data is the data owner, for example, the first data is created literary work, a video, or a picture, the data owner can directly store the first data in the trusted device. If the provider of the first data is not the data owner, for example, the first data is Zhang San's bank account statement, the provider is a bank, and the owner is Zhang San, there can be a limitation: the first data is data obtained by the trusted device from a trusted data source. For example, Zhang San can apply for a salary statement on a website of the bank, and then the bank sends the salary statement to an email address provided by Zhang San. Then, a program can be pre-installed in the trusted device, and the salary statement sent by the bank is obtained from the email address through an interface defined by the program. The TEE can play a role of a hardware black box. Code and data executed in the TEE cannot be snooped even at an operating system layer, and can only be operated through an interface predefined in the code. Therefore, the trusted device can obtain trusted data through the interface predefined in the code in the TEE. For example, to obtain a salary statement, an interface corresponding to an email address is installed in the TEE in advance. Because the code in the TEE cannot be tampered with, it can be ensured that the salary statement obtained by the trusted device is obtained from the specified address, therefore, the salary statement is trustable.

In a more convenient implementation, the trusted device is a pluggable device, and the pluggable device is deployed with a trusted execution environment. Optionally, the pluggable device is a USB flash drive. In addition, the USB flash drive obtains the first data from a terminal of the data owner based on the trusted execution environment. Specifically, the trusted device obtains the first data from the data owner through an interface predefined in code in the trusted execution environment.

To increase security of the trusted USB flash drive, the trusted USB flash drive has a unified serial number and is bound to a hardware device connected for the first time. The trusted USB flash drive can only communicate with the bound device. Moreover, data in the trusted USB flash drive can only be added and deleted, and cannot be modified.

To protect the first data from being leaked, the description information of the first data is published on a platform. The description information can be a data type, an overall structure, etc. of the first data.

A process in which the description information is obtained based on user data can be executed in the trusted USB flash drive, or can be processed in a trusted environment in a trusted network constructed by a supply and demand platform. For example, a TAPP is used for secure computation. Medical case information is used as an example. The description information can be a disease name, an age of a patient, a medication type, a medication time, etc.

In an implementation, the description information is generated by a secure application in the trusted device. Personal information of a user is obtained from the trusted data source based on ISV software installed in the trusted USB flash drive, and the personal information of the user is processed by using a TAPP function in the trusted USB flash drive, to obtain description information of the user data, and publish the description information in a supply and demand network.

In another implementation, the first data of the data owner is received; and the first data is processed by using the secure application, to obtain the description information of the first data. It is worthwhile to note that the supply and demand platform deploys the trusted execution environment, to construct a trusted network. Specifically, in this solution, the supply and demand network can be constructed into the trusted network by using hardware or software, to protect the private data.

When the supply and demand network is a blockchain network, each blockchain node can create and invoke a smart contract through a virtual machine. A transaction including the smart contract and an execution result of the transaction are stored on a blockchain ledger, or each full node in the blockchain stores all the ledger, which is a challenge for privacy protection. Privacy protection can be implemented by using various technologies, for example, a cryptography technology (for example, homomorphic encryption, or zero-knowledge proof), a hardware privacy technology, and a network isolation technology. A typical hardware privacy protection technology includes a trusted execution environment (TEE).

For example, each blockchain node can implement a secure execution environment of a blockchain transaction by using the TEE. The TEE is a CPU hardware-based secure extension and a trusted execution environment that is isolated from the outside. Currently, the industry pays close attention to a TEE solution. Almost all mainstream chip and software alliances have respective TEE solutions, for example, a trusted platform module (TPM) for software, and software guard extensions (SGX), ARM Trustzone (trustzone), AMD platform security processor (PSP), etc. for hardware. The TEE can play a role of a hardware black box. Code and data executed in the TEE cannot be snooped even at an operating system layer, and can only be operated through a predefined interface in the code. In terms of efficiency, due to a black box nature of the TEE, plaintext data is operated in the TEE, rather than a complex cryptography operation in homomorphic encryption. There is almost no efficiency loss in a computation process. Therefore, the TEE is deployed on the blockchain node, so that privacy needs in a blockchain scenario can be satisfied to a large extent with a relatively small performance loss.

The SGX technology is used as an example. The blockchain node can create an enclave based on the SGX technology, so that the enclave is used as a TEE for executing a blockchain transaction. The blockchain node uses a newly added processor instruction in a CPU to allocate a part of memory as an EPC (Enclave Page Cache, enclave page cache or enclave page cache), so that the previous enclave can reside in the EPC. A memory area corresponding to the EPC is encrypted by a memory encryption engine (MEE) inside the CPU. Content in the memory area (code and data in the enclave) can only be decrypted in a CPU core and a key used for encryption and decryption is generated and stored in the CPU only when the EPC is started. It can be seen that a security boundary of the enclave only includes the enclave and the CPU. Neither privileged software nor unprivileged software can access the enclave, even an operating system administrator and a virtual machine monitor (VMM; or referred to as a hypervisor) cannot affect the code and data in the enclave. Therefore, the enclave has very high security. In addition, while the security is guaranteed, the CPU can process the blockchain transaction in a form of plaintext in the enclave, and has very high computation efficiency. Therefore, both data security and computation efficiency are considered. Data entering and exiting the TEE can be encrypted, to ensure data privacy.

The blockchain network (BlockChain Network) is a new distributed infrastructure and a computation method in which a blockchain-type data structure is used to verify and store data, a distributed node consensus algorithm is used to generate and update data, a cryptography method is used to ensure security of data transmission and access, and a smart contract including automation script code is used to program and operate data. The blockchain network includes a plurality of nodes. When a node broadcasts information or a block to the blockchain network, all nodes can receive the information or the block, and verify the received block. When a block is verified by a number of nodes in the blockchain network that surpasses a predetermined threshold, it is determined that the verification performed by the blockchain network on the block succeeds, and all nodes receive the block and store the block in a local node space. The node can be understood as an electronic device with a storage function such as a server or a terminal. The blockchain network mainly includes a public blockchain, a consortium blockchain, and a private blockchain.

Step 104: Obtain a data acquisition request sent by a data requestor for the first data in response to the description information, where the data acquisition request is used to request to retrieve the first data based on a first resource.

When the data requestor of the first data sees the description information of the first data on the supply and demand platform, the data requestor initiates an application to retrieve the first data on the platform. The data requestor can also be referred to as a data user.

In addition, to retrieve the first data, the data requestor or the data owner can specify a resource that needs to be used for exchange. The first resource is a data resource or a currency resource. The data owner can limit a type and a number of the first resource. The data requestor can also apply for another method, to apply for consent from the data owner.

When the first resource is specified by the data owner, the description information of the first data can also include the first resource.

Step 106: Send the data acquisition request to the data owner of the first data.

A user of the supply and demand platform (network) can be an individual user or an enterprise user. To facilitate privacy protection, the description information published on the supply and demand platform can or does not have to include the data owner of the first data, and the data requestor does not have to know identity information of the data owner. The supply and demand platform needs to forward the data acquisition request to the data owner of the first data.

The data owner can also be referred to as a data holder, a data possessor, etc.

Step 108: Obtain first confirmation information from the data owner.

If the data owner agrees with the data acquisition request from the data requestor, the data owner returns a confirmation to make the data owner understands a purpose for which the data requestor purchases the first data, the basic data and the purpose of purchase of the data requestor can be noted in the data acquisition request. For the individual user, the basic data can include some or all of information such as a personal name, gender, nationality, an ID type, an ID number, an age, an occupation, a mobile phone number, and a contact address. For the enterprise user, the basic data can include some or all of information such as a name of an enterprise, a business license number, an address of a business place, a name of a legal representative, an ID type, an ID number, and an expiration date.

The basic information is non-public information on the platform and is only disclosed to the data owner of the first data.

Step 110: Obtain the first data from the trusted device based on the first confirmation information. Step 110 can be performed by using a secure application. The trusted device can obtain the first data from the data owner through the interface predefined in code in the trusted execution environment.

Step 112: Send the first data to the data requestor.

When the data owner agrees to sell the first data to the data requestor, when a condition is satisfied, for example, when the first resource provided by the data requestor is received, the supply and demand platform can obtain the first data from the trusted device, and send the first data to the data requestor. The entire process can be completed by using the smart contract.

To improve security, the sending the first data to the data requestor can specifically include: sending the first data to the data requestor by using the secure application, where the secure application is a program selected by the data owner.

In the previous method, the first data can be prevented from being sent to another user or being stolen. In addition, the supply and demand platform is an intermediary in the entire process, which is responsible for trusted transmission of data, and does not store the first data.

It should be understood that orders of some steps of the method described in one or more embodiments of the present specification can be exchanged based on actual needs, or some steps can be omitted or deleted.

In the method in FIG. 1, the first data is stored in the trusted device, and only the description information of the first data is published on the supply and demand platform, to effectively protect the first data from being stolen. In addition, the first data is stored in the trusted device, to ensure that a data source of the first data is trustable, and prevent the first data from being tampered with.

In addition, in a transmission process, the first data can also be encrypted. To send the first data only to the data requestor, a public key of the data requestor can be used to encrypt the first data, and the encrypted first data is sent to the data requestor. In the blockchain network, a public key of each blockchain node is public. Therefore, the public key of the data requestor can be directly obtained, to encrypt the first data. A private key of the data requestor is saved only by the data requestor. Therefore, the encrypted first data can only be decrypted and retrieved by the data requestor.

In addition, a public key of the data owner can also be used to encrypt the first data, and then the encrypted first data and a private key of the data owner are sent to the data requestor for decryption.

Specifically, before the obtaining the first data from the trusted device, the method can further include:

sending the private key of the data owner to the data requestor; and the sending the first data to the data requestor can specifically include:

encrypting the first data by using the public key of the data owner; and sending the encrypted first data to the data requestor.

The step of "sending the private key of the data owner to the data requestor" is equivalent to a process of authorizing retrieval permission for the first data. In this process, it can only be ensured that the first data can only be retrieved by a user with the retrieval permission, and cannot be retrieved by another user without the permission.

In addition, the data acquisition request from the data requestor for the first data can be to obtain a right to use the first data, or can be to obtain an ownership of the first data.

When the data acquisition request from the data requestor for the first data is to obtain the ownership of the first data, after sending the first data to the data requestor, the method can further include:

obtaining second confirmation information from the data requestor, where the second confirmation information indicates that the data requestor has received the first data; and deleting the first data from the trusted device.

In this method, the data acquisition request from the data requestor for the first data is to obtain the ownership of the first data. After the data requestor receives the first data, the first data in the trusted device needs to be deleted. In another feasible method, the step of "obtaining the first data from the trusted device" can be to perform an operation similar to "cutting" on the first data in the trusted device, that is, to delete the first data in the trusted device. In addition, the first data is stored in a cache of the platform. After the data requestor receives the first data, the first data in the cache of the platform is deleted.

When the data acquisition request from the data requestor for the first data is to obtain the right to use the first data, after sending the first data to the data requestor, the method can further include:

obtaining third confirmation information from the data requestor, where the third confirmation information indicates that the data requestor has received the first data;

storing a mapping relationship between the first data and the data requestor in the blockchain network; and updating a usage record of the first data.

In this method, information about each transaction of the first data is stored in the blockchain network, to record a purchaser and a number of purchases. The usage record can be a number of users who retrieve the first data, or a time period in which more users are retrieving the first data. For example, when the first data is literary work or video work, a specific type of data more popular with other users can be analyzed based on a retrieval situation of each piece of data, so that the same type of data can be recommended to the other users.

In addition, the "mapping relationship between the first data and the data requestor" and the "usage record" can also be sent to the data requestor, and specifically, can be stored in the trusted device.

Optionally, the method can further include:

sending the mapping relationship between the first data and the data requestor to the trusted device for storage; and sending the usage record of the first data to the trusted device for storage.

The data requestor can analyze, based on the usage record of the first data, whether the first data is popular and which data is popular, and can update the data correspondingly.

Optionally, before the obtaining the first data from the trusted device, the method further includes the following:

determining whether the first resource from the data requestor is received, to obtain a first determining result;

the obtaining the first data from the trusted device specifically includes the following:

obtaining the first data from the trusted device when the first determining result is that the first resource from the data requestor is received.

determining whether fourth confirmation information from the data requestor is received, to obtain a second determining result, where the fourth confirmation information indicates that the data requestor has received the first data; and forwarding the first resource to the data owner when the second determining result is that the fourth confirmation information from the data requestor is received.

In the previous method, how to complete a transaction process of the first data based on the first resource is provided.

When the first resource is a currency resource, assuming that the first data is literary work, if the literary work needs to be obtained, a corresponding currency needs to be paid, for example, 19 yuan. First, the user needs to pay 19 yuan, 19 yuan is stored in an account of the platform, and then the platform sends the first data to the user. After the user retrieves the first data, 19 yuan is transferred to an account of the data owner.

When the first resource is a digital resource, assuming that the first data is medical case information, and an owner of the medical case information is a medical research institution, to obtain more medical case information, the first resource in exchange for the first data can also be requested to be medical case information, to share information and achieve a win-win situation. In this case, a processing method is basically the same as that of the currency resource. The first resource can be temporarily stored on the platform, and after the data requestor receives the first data, the first resource is sent to the data owner. In addition, the first resource can also be encrypted in a method used to encrypt the first data. Details are omitted here again.

Figure 2:
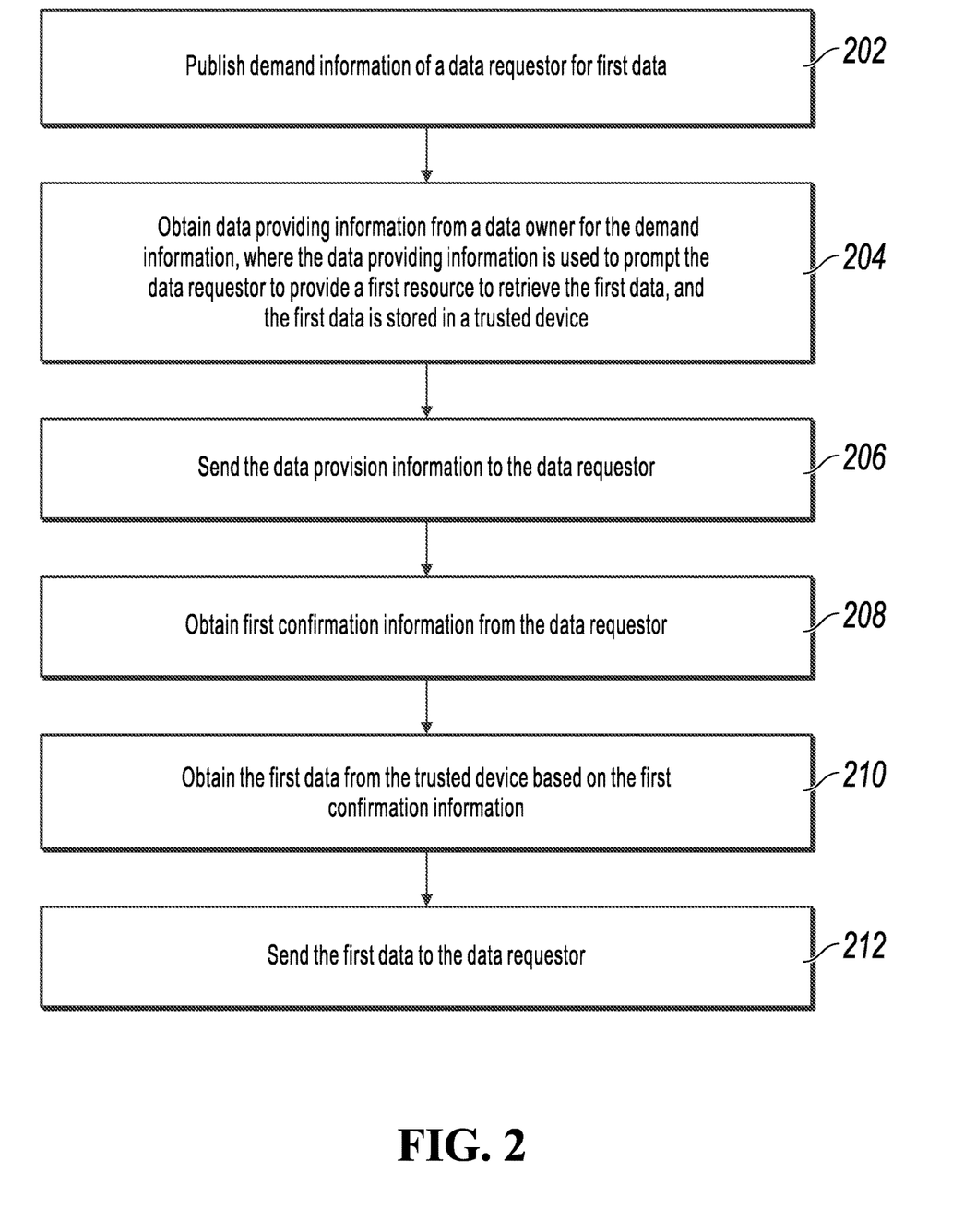
FIG. 2 is a schematic flowchart illustrating another trusted device-based data acquisition method, according to embodiments of the present specification.

The method in FIG. 1 is written from a perspective of data supply. FIG. 2 is a schematic flowchart illustrating another trusted device-based data acquisition method, according to embodiments of the present specification. FIG. 2 is described from a perspective of data need. As shown in FIG. 2, the method can include the following steps.

Step 202: Publish demand information of a data requestor for first data.

The demand information here can correspond to the description information in FIG. 1, and the demand information can indicate a needed data type, for example, case type. The demand information can further indicate a type of resource in exchange for the first data.

Step 204: Obtain data providing information from a data owner for the demand information, where the data providing information is used to prompt the data requestor to provide a first resource to retrieve the first data, and the first data is stored in a trusted device.

The data providing information can include data that can be provided by the data owner, and can have a simple description, so that the data requestor easily determines whether the data is needed by the data requestor. In addition, it can be further noted that the data that can be provided is stored in the trusted device.

Step 206: Send the data providing information to the data requestor.

Step 208: Obtain first confirmation information from the data requestor.

If the data requestor agrees to provide the first data in a method indicated in the data providing information, an affirmative reply is sent.

Step 210: Obtain the first data from the trusted device based on the first confirmation information.

Step 212: Send the first data to the data requestor.

Optionally, the trusted device is a device of the data owner.

Optionally, the first data is data obtained by the trusted device from a trusted data source.

Optionally, the trusted device is a pluggable device, the pluggable device is deployed with a trusted execution environment, and the trusted execution environment is isolated from an operating system layer.

Optionally, the pluggable device is a USB flash drive.

Optionally, the trusted device obtains the first data from a terminal of the data owner based on the trusted execution environment.

Optionally, the trusted device obtains the first data from a terminal of the data owner based on the trusted execution environment can specifically include:

The trusted device obtains the first data from the terminal of the data owner through an interface predefined in code in the trusted execution environment.

Optionally, after the sending the first data to the data requestor, the method can further include:

obtaining second confirmation information from the data requestor, where the second confirmation information indicates that the data requestor has received the first data; and deleting the first data from the trusted device.

Optionally, after the sending the first data to the data requestor, the method can further include:

obtaining third confirmation information from the data requestor, where the third confirmation information indicates that the data requestor has received the first data;

storing a mapping relationship between the first data and the data requestor in the blockchain network; and updating a usage record of the first data.

Optionally, the method can further include:

sending the mapping relationship between the first data and the data requestor to the trusted device for storage; and sending the usage record of the first data to the trusted device for storage.

Optionally, the sending the first data to the data requestor can specifically include:

sending the first data to the data requestor by using a secure application, where the secure application is a program selected by the data owner.

Optionally, the first resource is a data resource or a currency resource.

Optionally, before the obtaining the first data from the trusted device, the method can further include:

sending a private key of the data owner to the data requestor; and the sending the first data to the data requestor specifically includes the following:

encrypting the first data by using a public key of the data owner; and sending the encrypted first data to the data requestor.

For the previous extension solution, references can be made to description of a corresponding part in FIG. 1. Details are omitted here again.

Figure 3:
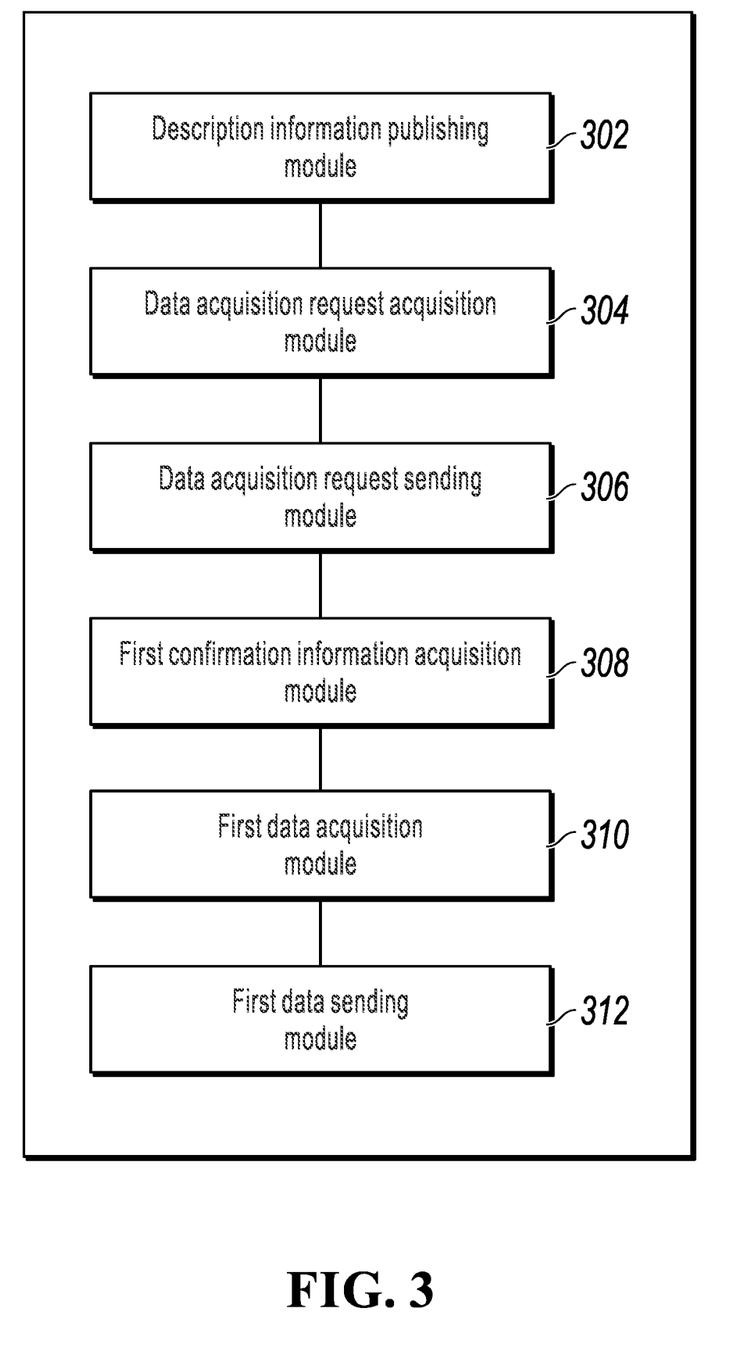
FIG. 3 is a schematic structural diagram illustrating a trusted device-based data acquisition apparatus corresponding to FIG. 1, according to embodiments of the present specification.

Based on a same idea, embodiments of the present specification further provide an apparatus corresponding to the previous method. FIG. 3 is a schematic structural diagram illustrating a trusted device-based data acquisition apparatus corresponding to FIG. 1, according to embodiments of the present specification. As shown in FIG. 3, the apparatus can include:

a description information publishing module 302, configured to publish description information of first data, where the first data is stored in a trusted device;

a data acquisition request acquisition module 304, configured to obtain a data acquisition request sent by a data requestor for the first data in response to the description information, where the data acquisition request is used to request to retrieve the first data based on a first resource;

a data acquisition request sending module 306, configured to send the data acquisition request to a data owner of the first data;

a first confirmation information acquisition module 308, configured to obtain first confirmation information from the data owner;

a first data acquisition module 310, configured to obtain the first data from the trusted device based on the first confirmation information; and a first data sending module 312, configured to send the first data to the data requestor.

Based on the apparatus in FIG. 3, embodiments of the present specification further provide some specific implementations of the apparatus. Description is provided below.

Optionally, the trusted device is a device of the data owner.

Optionally, the first data is data obtained by the trusted device from a trusted data source.

Optionally, the trusted device is a pluggable device, the pluggable device is deployed with a trusted execution environment, and the trusted execution environment is isolated from an operating system layer.

Optionally, the pluggable device is a USB flash drive.

Optionally, the trusted device obtains the first data from a terminal of the data owner based on the trusted execution environment.

Optionally, that the trusted device obtains the first data from a terminal of the data owner based on the trusted execution environment can specifically include:

The trusted device obtains the first data from the terminal of the data owner through an interface predefined in code in the trusted execution environment.

Optionally, the apparatus can further include:

a second confirmation information acquisition module, configured to obtain second confirmation information from the data requestor, where the second confirmation information indicates that the data requestor has received the first data; and a first data deletion module, configured to delete the first data from the trusted device.

Optionally, the apparatus can further include:

a third confirmation information acquisition module, configured to obtain third confirmation information from the data requestor, where the third confirmation information indicates that the data requestor has received the first data;

a mapping relationship storage module, configured to store a mapping relationship between the first data and the data requestor in a blockchain network; and a usage record update module, configured to update a usage record of the first data.

Optionally, the apparatus can further include:

a mapping relationship sending module, configured to send the mapping relationship between the first data and the data requestor to the trusted device for storage; and a usage record sending module, configured to send the usage record of the first data to the trusted device for storage.

Optionally, the apparatus can further include:

a first data receiving module, configured to receive the first data from the data owner; and a first data processing module, configured to process the first data by using a secure application, to obtain the description information of the first data.

Optionally, the description information is generated by a secure application in the trusted device.

Optionally, the first data sending module 312 is specifically configured to send the first data to the data requestor by using a secure application, where the secure application is a program selected by the data owner.

Optionally, the apparatus can further include:

a first determining module, configured to determine whether the first resource from the data requestor is received, to obtain a first determining result.

The first data acquisition module 310 is specifically configured to obtain the first data from the trusted device when the first determining result is that the first resource from the data requestor is received.

Optionally, the apparatus can further include:

a second determining module, configured to determine whether fourth confirmation information from the data requestor is received, to obtain a second determining result, where the fourth confirmation information indicates that the data requestor has received the first data; and a first resource forwarding module, configured to forward the first resource to the data owner when the second determining result is that the fourth confirmation information from the data requestor is received.

Optionally, the first resource is a data resource or a currency resource.

Optionally, the apparatus can further include:

a private key sending module, configured to send a private key of the data owner to the data requestor; and the first data sending module 312 can specifically include:

a first encryption unit, configured to encrypt the first data by using a public key of the data owner; and a first sending unit, configured to send the encrypted first data to the data requestor.

Optionally, the first data sending module 312 can specifically include:

a second encryption unit, configured to encrypt the first data by using a public key of the data requestor; and a second sending unit, configured to send the encrypted first data to the data requestor.

Figure 4:
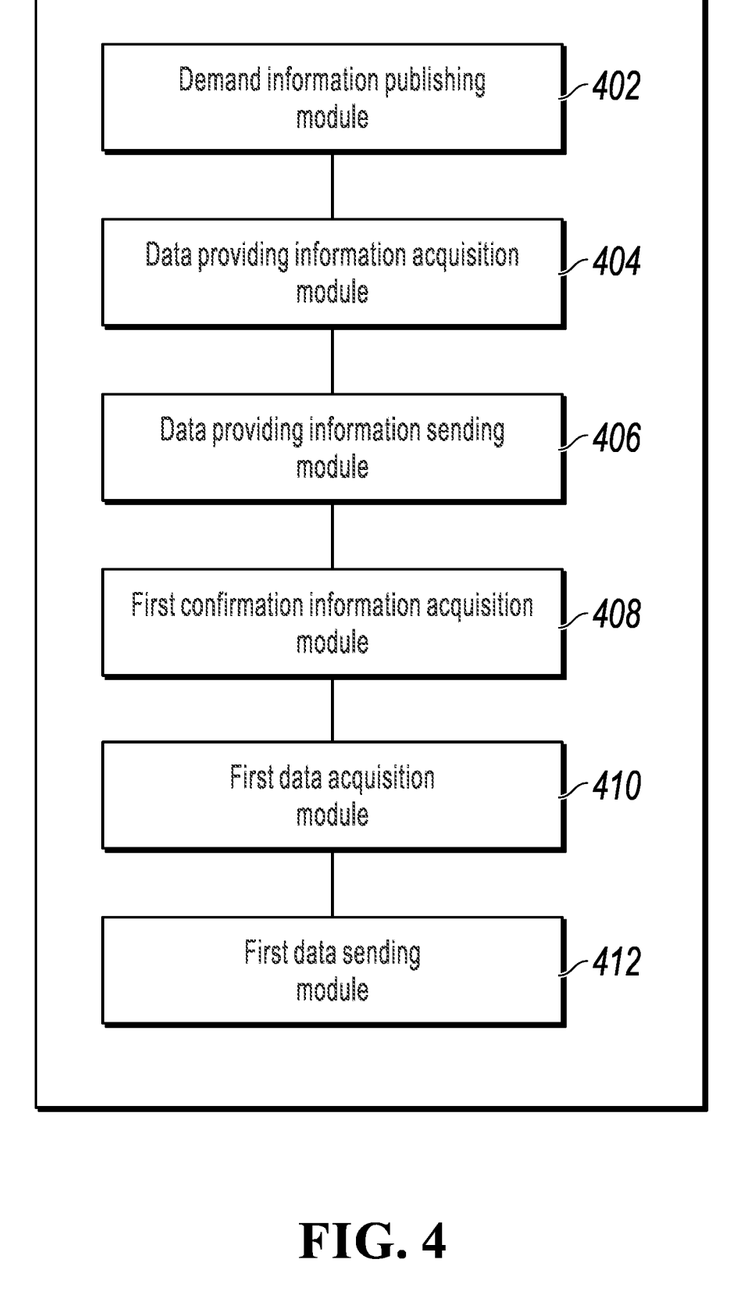
FIG. 4 is a schematic structural diagram illustrating a trusted device-based data acquisition apparatus corresponding to FIG. 2, according to embodiments of the present specification.

FIG. 4 is a schematic structural diagram illustrating a trusted device-based data acquisition apparatus corresponding to FIG. 2, according to embodiments of the present specification. As shown in FIG. 4, the apparatus can include:

a demand information publishing module 402, configured to publish demand information of a data requestor for first data;

a data providing information acquisition module 404, configured to obtain data providing information from a data owner for the demand information, where the data providing information is used to prompt the data requestor to provide a first resource to retrieve the first data, and the first data is stored in a trusted device;

a data providing information sending module 406, configured to send the data providing information to the data requestor;

a first confirmation information acquisition module 408, configured to obtain first confirmation information from the data requestor;

a first data acquisition module 410, configured to obtain the first data from the trusted device based on the first confirmation information; and a first data sending module 412, configured to send the first data to the data requestor.

Based on the apparatus in FIG. 4, embodiments of the present specification further provide some specific implementations of the apparatus. Description is provided below.

Optionally, the trusted device is a device of the data owner.

Optionally, the first data is data obtained by the trusted device from a trusted data source.

Optionally, the trusted device is a pluggable device, the pluggable device is deployed with a trusted execution environment, and the trusted execution environment is isolated from an operating system layer.

Optionally, the pluggable device is a USB flash drive.

Optionally, the trusted device obtains the first data from a terminal of the data owner based on the trusted execution environment.

Optionally, that the trusted device obtains the first data from a terminal of the data owner based on the trusted execution environment can specifically include:

The trusted device obtains the first data from the terminal of the data owner through an interface predefined in code in the trusted execution environment.

Optionally, the apparatus can further include:

a second confirmation information acquisition module, configured to obtain second confirmation information from the data requestor, where the second confirmation information indicates that the data requestor has received the first data; and a first data deletion module, configured to delete the first data from the trusted device.

Optionally, the apparatus can further include:

a third confirmation information acquisition module, configured to obtain third confirmation information from the data requestor, where the third confirmation information indicates that the data requestor has received the first data;

a mapping relationship storage module, configured to store a mapping relationship between the first data and the data requestor in a blockchain network; and a usage record update module, configured to update a usage record of the first data.

Optionally, the apparatus can further include:

a mapping relationship sending module, configured to send the mapping relationship between the first data and the data requestor to the trusted device for storage; and a usage record sending module, configured to send the usage record of the first data to the trusted device for storage.

Optionally, the first data sending module 412 is specifically configured to send the first data to the data requestor by using a secure application, where the secure application is a program selected by the data owner.

Optionally, the first resource is a data resource or a currency resource.

Optionally, the apparatus can further include:

a private key sending module, configured to send a private key of the data owner to the data requestor; and the first data sending module 412 specifically includes the following:

a first encryption unit, configured to encrypt the first data by using a public key of the data owner; and a first sending unit, configured to send the encrypted first data to the data requestor.

Based on a same idea, embodiments of the present specification further provide a device corresponding to the previous method.

Figure 5:
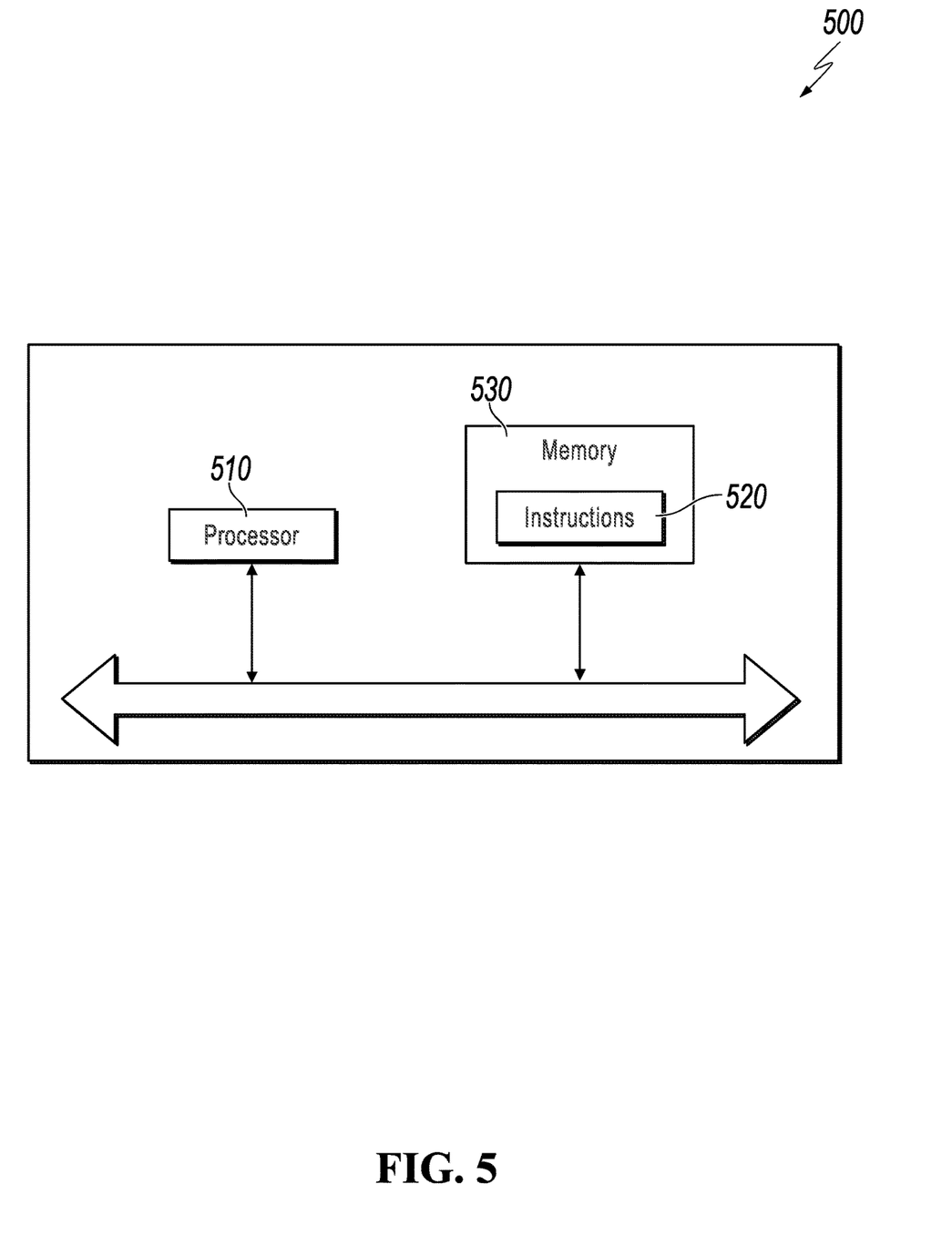
FIG. 5 is a schematic structural diagram illustrating a trusted device-based data acquisition device, according to embodiments of the present specification.

FIG. 5 is a schematic structural diagram illustrating a trusted device-based data acquisition device, according to embodiments of the present specification. As shown in FIG. 5, a device 500 can include:

at least one processor 510; and a memory 530 coupled to the at least one processor.

The memory 530 stores instructions 520 that can be executed by the at least one processor 510, and the instructions are executed by the at least one processor 510, to enable the at least one processor 510 to:

publish description information of first data, where the first data is stored in a trusted device;

obtain a data acquisition request sent by a data requestor for the first data in response to the description information, where the data acquisition request is used to request to retrieve the first data based on a first resource;

send the data acquisition request to a data owner of the first data;

obtain first confirmation information from the data owner;

obtain the first data from the trusted device based on the first confirmation information; and send the first data to the data requestor.

Alternatively, the at least one processor 510 is enabled to:

publish demand information of a data requestor for first data;

obtain data providing information from a data owner for the demand information, where the data providing information is used to prompt the data requestor to provide a first resource to retrieve the first data, and the first data is stored in a trusted device;

send the data providing information to the data requestor;

obtain first confirmation information from the data requestor;

obtain the first data from the trusted device based on the first confirmation information; and send the first data to the data requestor.

Based on a same idea, embodiments of the present specification further provide a computer-readable medium corresponding to the previous method. The computer-readable medium stores computer-readable instructions, and the computer-readable instructions can be executed by a processor to implement the following method:

publishing description information of first data, where the first data is stored in a trusted device;

obtaining a data acquisition request sent by a data requestor for the first data in response to the description information, where the data acquisition request is used to request to retrieve the first data based on a first resource;

sending the data acquisition request to a data owner of the first data;

obtaining first confirmation information from the data owner;

obtaining the first data from the trusted device based on the first confirmation information; and sending the first data to the data requestor.

Alternatively, the computer-readable instructions can be executed by a processor to implement the following method:

publishing demand information of a data requestor for first data;

obtaining data providing information from a data owner for the demand information, where the data providing information is used to prompt the data requestor to provide a first resource to retrieve the first data, and the first data is stored in a trusted device;

sending the data providing information to the data requestor;

obtaining first confirmation information from the data requestor;

obtaining the first data from the trusted device based on the first confirmation information; and sending the first data to the data requestor.

The implementations in the present specification are described in a progressive way. For same or similar parts in the implementations, reference can be made to each other. Each implementation focuses on a difference from other implementations. Especially, the trusted device-based data acquisition device shown in FIG. 5 is basically similar to the method embodiments, and therefore is described briefly. For related parts, references can be made to some descriptions in the method embodiments.

In the 1990s, it can be clearly identified whether a technology is improved in terms of hardware (for example, a circuit structure of a diode, a transistor, or a switch is improved) or is improved in terms of software (a method process is improved). However, as technologies develop, improvements in many current method processes can be considered as a direct improvement in a hardware circuit structure. Almost all designers obtain corresponding hardware circuit structures by programming improved method processes to hardware circuits. Therefore, it cannot be said that the improvement in a method process cannot be implemented by using a hardware entity module. For example, a programmable logic device (PLD) (for example, a field programmable gate array (FPGA)) is such an integrated circuit whose logic function is determined by programming a device by a user. Design personnel "integrate" a digital system into a single PLD by means of programming without requiring a chip manufacturer to design and produce a dedicated integrated circuit chip. In addition, at present, instead of manually manufacturing an integrated chip, this type of programming is mostly implemented by using "logic compiler" software. The programming is similar to a software compiler used to develop and write a program. Original code needs to be written in a specific programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. It should also be clear to a person skilled in the art that a hardware circuit of a logic method process can be easily obtained by performing logic programming on the method process through several earlier described hardware description languages and programming the method process to an integrated circuit.

A controller can be implemented in any appropriate way. For example, the controller can take the form of, for example, a microprocessor or a processor and a computer-readable medium storing computer-readable program code (such as software or firmware) that can be executed by the microprocessor or the processor, a logic gate, a switch, an application-specific integrated circuit (ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller can also be implemented as a part of control logic of a memory. A person skilled in the art also know that, in addition to implementing the controller by using the computer readable program code, logic programming can be performed on method steps to allow the controller to implement the same function in forms of the logic gate, the switch, the programmable logic controller, the programmable logic controller, and the embedded microcontroller. Therefore, such a controller can be considered as a hardware component. An apparatus included in the controller and configured to implement various functions can be considered as a structure in the hardware component. Alternatively, the apparatus configured to implement various functions can even be considered as both a software module implementing the method and a structure in the hardware component.

The system, apparatus, module or unit illustrated in the earlier described implementations can be implemented by a computer chip or an entity, or can be implemented by a product having a certain function. A typical implementation device is a computer. Specifically, the computer can be, for example, a personal computer, a laptop computer, a cellular phone, a camera phone, an intelligent phone, a personal digital assistant, a media player, a navigation device, an email device, a game console, a tablet, a wearable device, or a combination thereof.

For ease of description, the apparatus is described by dividing the functions into various units. Certainly, when the present application is implemented, the functions of all units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present invention can use a form of a computer program product that is implemented on one or more computer-usable storage media (including but not limited to a magnetic disk storage, a CD-ROM, an optical memory, etc.) that include computer-usable program code.

The present invention is described with reference to the flowcharts and/or block diagrams of the method, the device (system), and the computer program product according to the implementations of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific method, so that the instructions stored in the computer readable memory generate a product that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In typical configuration, a computing device includes one or more processors (CPU), an input/output interface, a network interface, and a memory.

The memory can include a non-persistent memory, a random access memory (RAM), and/or a nonvolatile memory in a computer-readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be computer readable instructions, a data structure, a program module, or other data. A computer storage medium includes but is not limited to a phase change memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include a transitory computer-readable media (transitory media), for example, a modulated data signal and carrier.

It needs to be further noted that the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such a process, method, product, or device. An element preceded by "includes a . . . " does not, without more constraints, preclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

The present application can be described in the general context of executable computer instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices that are connected through a communications network. In a distributed computing environment, the program module can be located in both local and remote computer storage media including storage devices.

The previous descriptions are merely implementations of the present application, and are not intended to limit the present application. For a person skilled in the art, the present application can have various modifications and changes. Any modifications, equivalent substitutions, and improvements made in the spirit and principle of the present application shall fall in the scope of the claims in the present application.

What is claimed is:

1. A computer-implemented method, comprising:
   generating, a description of target data, wherein the target data is stored in a trusted device of a data owner;
   publishing, as a published description, the description of the target data without publishing the target data;
   in response to the published description, receiving a data acquisition request from a data requestor for the target data wherein the data acquisition request is configured to retrieve the target data from a first resource;
   sending the data acquisition request to the data owner;
   receiving first confirmation information from the data owner;
   identifying the target data from the trusted device based on the first confirmation information; and
   sending the target data to the data requestor, wherein the trusted device is a pluggable device that bounds exclusively to a hardware device it first connects to, and wherein the trusted device comprises a trusted execution environment (TEE) isolated from an operating system, and the pluggable device is configured to allow data to be added and removed, but unallowable to be modified.

2. The computer-implemented method according to claim 1, wherein that the target data is obtained by the trusted device from a terminal device of the data owner through an interface provided by the TEE.

3. The computer-implemented method according to claim 1, comprising:
   receiving second confirmation information from the data requestor after sending the data acquisition request, wherein the second confirmation information indicates that the data requestor has received the target data; and
   deleting the target data from the trusted device.

4. The computer-implemented method according to claim 1, comprising:
   obtaining third confirmation information from the data requestor, wherein the third confirmation information indicates that the data requestor has received the target data;
   storing a mapping relationship between the target data and the data requestor in a blockchain of a blockchain network; and
   updating, based on the mapping relationship, a usage record of the target data, wherein the usage record comprises a number of users who retrieves the target data.

5. The computer-implemented method according to claim 4, comprising:
   sending the mapping relationship between the target data and the data requestor to the trusted device for storage; and
   sending the usage record of the target data to the trusted device to be stored by the trusted device.

6. The computer-implemented method according to claim 1, comprising:

determining that fourth confirmation information from the data requestor is received, wherein the fourth confirmation information indicates that the data requestor has received the target data; and in response to determining that the fourth confirmation information is received, sending the first resource to the data owner.

7. The computer-implemented method according to claim 1, comprising:

sending a private key of the data owner to the data requestor; and encrypting the target data by using a public key of the data owner corresponding to the private key before sending the target data to the data requestor.

8. A non-transitory, computer-readable medium storing one or more instructions executable by a computer system to perform operations comprising:

generating, a description of target data, wherein the target data is stored in a trusted device of a data owner;

publishing, as a published description, the description of the target data without publishing the target data;

in response to the published description, receiving a data acquisition request from a data requestor for the target data wherein the data acquisition request is configured to retrieve the target data from a first resource;

sending the data acquisition request to the data owner;

receiving first confirmation information from the data owner;

identifying the target data from the trusted device based on the first confirmation information; and sending the target data to the data requestor, wherein the trusted device is a pluggable device that bounds exclusively to a hardware device it first connects to, and wherein the trusted device comprises a trusted execution environment (TEE) isolated from an operating system, and the pluggable device is configured to allow data to be added and removed, but unallowable to be modified.

9. The non-transitory, computer-readable medium according to claim 8, wherein that the target data is obtained by the trusted device from a terminal device of the data owner through an interface provided by the TEE.

10. The non-transitory, computer-readable medium according to claim 8, comprising:

receiving second confirmation information from the data requestor after sending the data acquisition request, wherein the second confirmation information indicates that the data requestor has received the target data; and deleting the target data from the trusted device.

11. The non-transitory, computer-readable medium according to claim 8, comprising:

obtaining third confirmation information from the data requestor, wherein the third confirmation information indicates that the data requestor has received the target data;

storing a mapping relationship between the target data and the data requestor in a blockchain of a blockchain network; and updating a usage record of the target data, wherein the usage record comprises a number of users who retrieves the target data.

12. The non-transitory, computer-readable medium according to claim 11, comprising:

sending the mapping relationship between the target data and the data requestor to the trusted device for storage; and sending the usage record of the target data to the trusted device to be stored by the trusted device.

13. The non-transitory, computer-readable medium according to claim 8, comprising:

determining that fourth confirmation information from the data requestor is received, wherein the fourth confirmation information indicates that the data requestor has received the target data; and in response to determining that the fourth confirmation information is received, sending the first resource to the data owner.

14. The non-transitory, computer-readable medium according to claim 8, comprising:

sending a private key of the data owner to the data requestor; and encrypting the target data by using a public key of the data owner corresponding to the private key before sending the target data to the data requestor.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

generating, a description of target data, wherein the target data is stored in a trusted device of a data owner;

publishing, as a published description, the description of the target data without publishing the target data;

in response to the published description, receiving a data acquisition request from a data requestor for the target data wherein the data acquisition request is configured to retrieve the target data from a first resource;

sending the data acquisition request to the data owner;

receiving first confirmation information from the data owner;

identifying the target data from the trusted device based on the first confirmation information; and sending the target data to the data requestor, wherein the trusted device is a pluggable device that bounds exclusively to a hardware device it first connects to, and wherein the trusted device comprises a trusted execution environment (TEE) isolated from an operating system, and the pluggable device is configured to allow data to be added and removed, but unallowable to be modified.

16. The computer-implemented system according to claim 15, wherein that the target data is obtained by the trusted device from a terminal device of the data owner through an interface provided by the TEE.

17. The computer-implemented system according to claim 15, comprising:

receiving second confirmation information from the data requestor after sending the data acquisition request, wherein the second confirmation information indicates that the data requestor has received the target data; and deleting the target data from the trusted device.

\* \* \* \* \*

UNITED STATES PATENT AND TRADEMARK OFFICE
CERTIFICATE OF CORRECTION

| | |
|---|---|
| PATENT NO. | : 11,354,448 B2 |
| APPLICATION NO. | : 17/359476 |
| DATED | : June 7, 2022 |
| INVENTOR(S) | : Wenyu Yang et al. |

It is certified that error appears in the above-identified patent and that said Letters Patent is hereby corrected as shown below:

In the Claims

Column 20, Line 36, Claim 2, after "wherein", delete "that".

Column 21, Line 40, Claim 9, after "wherein", delete "that".

Column 22, Line 53, Claim 16, after "wherein", delete "that".

Signed and Sealed this
Thirtieth Day of August, 2022

Katherine Kelly Vidal
*Director of the United States Patent and Trademark Office*